(12) United States Patent
Tohara et al.

(10) Patent No.: US 10,510,139 B2
(45) Date of Patent: Dec. 17, 2019

(54) IMAGE DISPLAY APPARATUS

(71) Applicant: CANON KABUSHIKI KAISHA, Tokyo (JP)

(72) Inventors: Masakazu Tohara, Komae (JP); Masato Ogawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/110,497

(22) Filed: Aug. 23, 2018

(65) Prior Publication Data
US 2019/0066277 A1 Feb. 28, 2019

(30) Foreign Application Priority Data
Aug. 31, 2017 (JP) ................. 2017-166287

(51) Int. Cl.
*G06T 5/00* (2006.01)
*G09G 3/3208* (2016.01)

(52) U.S. Cl.
CPC .......... *G06T 5/006* (2013.01); *G09G 3/3208* (2013.01); *G09G 2340/14* (2013.01)

(58) Field of Classification Search
CPC ... G06T 5/006; G09G 3/3208; G09G 2340/14
USPC ...................................... 345/647
See application file for complete search history.

(56) References Cited

U.S. PATENT DOCUMENTS

| | | | |
|---|---|---|---|
| 6,185,045 B1 * | 2/2001 | Hanano | G02B 27/0172 359/630 |
| 6,288,689 B1 | 9/2001 | Shikama | |
| 2007/0018124 A1 * | 1/2007 | Nishi | G02B 27/0025 250/559.36 |
| 2010/0091031 A1 * | 4/2010 | Tsujimoto | G02B 27/017 345/589 |
| 2010/0195045 A1 * | 8/2010 | Nauche | G02C 13/005 351/204 |
| 2012/0105801 A1 * | 5/2012 | Yamakaji | G01M 11/0242 351/159.76 |
| 2018/0114298 A1 * | 4/2018 | Malaika | G02B 27/0093 |

FOREIGN PATENT DOCUMENTS

JP H10327373 A 12/1998
JP 2009036835 A 2/2009

* cited by examiner

*Primary Examiner* — Ke Xiao
*Assistant Examiner* — Kim Tranh T Tran
(74) *Attorney, Agent, or Firm* — Rossi, Kimms & McDowell LLP

(57) ABSTRACT

An image processing apparatus includes an image acquirer configured to acquire an input image, and a processor configured to generate the original image by performing for the input image correction processing using correction data according to an optical aberration of the observation optical system. In the correction processing for the oblique view state, the processor uses first correction data according to the optical aberration corresponding to a first position distant from the observation optical system by a distance made by adding a rotating radius of the eye to the first distance, to generate an area other than the specific area in the original image, and uses second correction data according to the optical aberration corresponding to a second position closer to the observation optical system than the first position to generate the specific area.

12 Claims, 9 Drawing Sheets

(a) CORRECTION BASED ON OPTICAL ABERRATION WITH EXIT PUPIL OF 28 mm
(b) CORRECTION BASED ON OPTICAL ABERRATION WITH EXIT PUPIL OF 26 mm
(c) CORRECTION BASED ON OPTICAL ABERRATION WITH EXIT PUPIL OF 24 mm
(d) CORRECTION BASED ON OPTICAL ABERRATION WITH EXIT PUPIL OF 22 mm
(e) CORRECTION BASED ON OPTICAL ABERRATION WITH EXIT PUPIL OF 20 mm
(f) CORRECTION BASED ON OPTICAL ABERRATION WITH EXIT PUPIL OF 18 mm

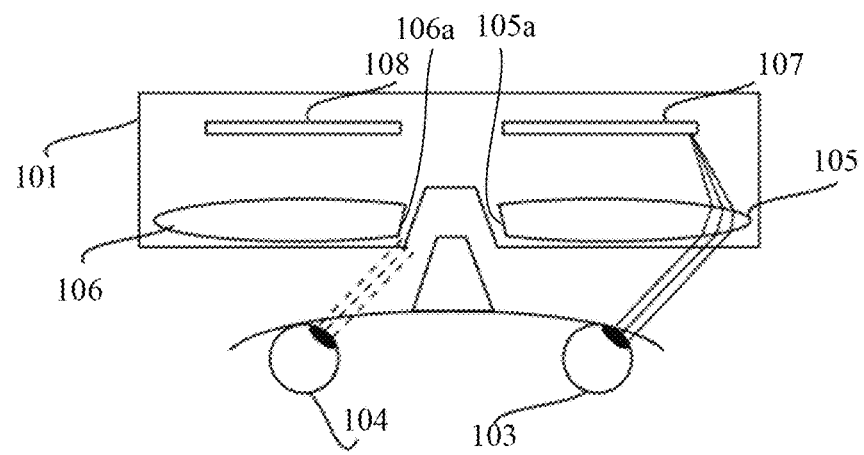
FIG. 3
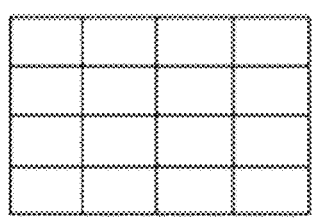  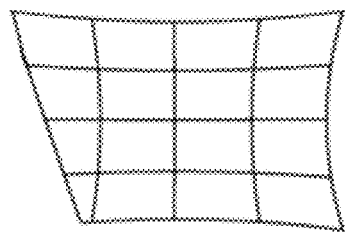  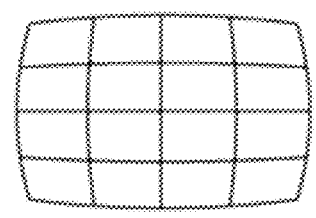
FIG. 4A    FIG. 4B    FIG. 4C (a) CORRECTION BASED ON OPTICAL ABERRATION WITH EXIT PUPIL OF 30 mm (b) CORRECTION BASED ON OPTICAL ABERRATION WITH EXIT PUPIL OF 18 mm

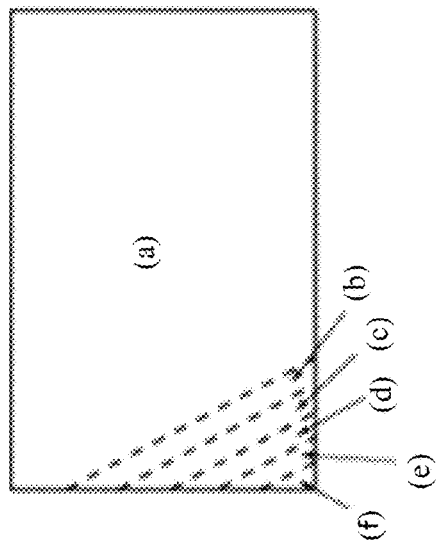

(a) CORRECTION BASED ON OPTICAL ABERRATION WITH EXIT PUPIL OF 28 mm
(b) CORRECTION BASED ON OPTICAL ABERRATION WITH EXIT PUPIL OF 26 mm
(c) CORRECTION BASED ON OPTICAL ABERRATION WITH EXIT PUPIL OF 24 mm
(d) CORRECTION BASED ON OPTICAL ABERRATION WITH EXIT PUPIL OF 22 mm
(e) CORRECTION BASED ON OPTICAL ABERRATION WITH EXIT PUPIL OF 20 mm
(f) CORRECTION BASED ON OPTICAL ABERRATION WITH EXIT PUPIL OF 18 mm

FIG. 13

IMAGE DISPLAY APPARATUS

BACKGROUND OF THE INVENTION

Field of the Invention

The present invention relates to an image display apparatus, such as a head mount display (HMD), used to observe an (original) image displayed on a display device (or element) via an observation optical system.

Description of the Related Art

The image display apparatus displays the original image on the display device after image processing (correction processing) is performed for the original image so as to reduce an optical aberration, such as a distortion and a lateral chromatic aberration, in the observation optical system. Japanese Laid-Open Patent Application No. ("JP") 10-327373 discloses an image display apparatus that displays on a display device an original image that has received correction processing that provides a distortion reverse to that in an observation optical system. This image display apparatus reduces a lateral chromatic aberration (chromatic aberration of magnification) by performing the correction processing for each of red, green, and blue.

As disclosed in JP 2009-36835, an HMD has a nose escape shape that is formed by cutting part of the observation optical system on the nose side so that the observation optical system does not interfere with the nose of an observer.

In the HMD having the nose escape shape in the observer optical system, the eye of the observer having a normal eye relief (distance between the observation optical system and eye) that is expected on the designed can rotate from a front view position views a field angle (angle of view) on the nose escape shape side. Then, the nose escape shape shields the light from the original image, and the image cannot be observed. Hence, correction data for the correction processing cannot be obtained by actually measuring the optical aberration at a field angle on the nose escape shape side of the observation optical system, and the correction data must be prepared through simulation with the optical aberration at a field angle other than the field angle on the nose escape shape side.

On the other hand, when the eyes of the observer view the field angle on the nose escape shape side with an eye relief smaller than the normal eye relief, the nose escape shape may not shield the light from the original image and the eyes may observe the image. In this case, the correction processing to the original image with the correction data prepared based on the optical aberration with the normal eye relief cannot fully correct the optical aberration or the good image cannot be observed since the optical aberration changes according to the eye relief. None of JPs 10-327373 and 2009-36835 are silent about the correction processing to the original image so that the good image can be viewed when the eyes view the field angle on the nose escape shape side.

SUMMARY OF THE INVENTION

The present invention provides an image observation apparatus that enables an observer to view a good image with a field angle on a nose escape side.

An image processing apparatus used with an image display apparatus and configured to generate an original image, the image display apparatus includes a display device configured to display the original image, and an observation optical system configured to lead light from the original image to an eye of an observer, the observation optical system, in an oblique view state for the eyes that are rotated from those facing a front in a front view state, not leading light from a specific area in the original image to the eye when a distance between the observation optical system and the eye is a first distance, and leading the light from the specific area to the eye when the distance between the observation optical system and the eye is a second distance shorter than the first distance. The image processing apparatus according to the present invention includes an image acquirer configured to acquire an input image, and a processor configured to generate the original image by performing for the input image correction processing using correction data according to an optical aberration of the observation optical system. In the correction processing for the oblique view state, the processor uses first correction data according to the optical aberration corresponding to a first position distant from the observation optical system by a distance made by adding a rotating radius of the eye to the first distance, to generate an area other than the specific area in the original image, and uses second correction data according to the optical aberration corresponding to a second position closer to the observation optical system than the first position to generate the specific area.

Further features of the present invention will become apparent from the following description of exemplary embodiments with reference to the attached drawings.

BRIEF DESCRIPTION OF THE DRAWINGS

FIG. 3 is a top view of the observation optical system when each eye of the observer in the first embodiment at a normal position rotates to the right.

FIGS. 4A to 4C illustrate distortion correction processing according to the first embodiment.

FIG. 13 illustrates a calculation area of an aberration correction value according to the second embodiment.

DESCRIPTION OF THE EMBODIMENTS

Referring now to the accompanying drawings, a description will be given of embodiments of the present invention.

First Embodiment

Figure 1:
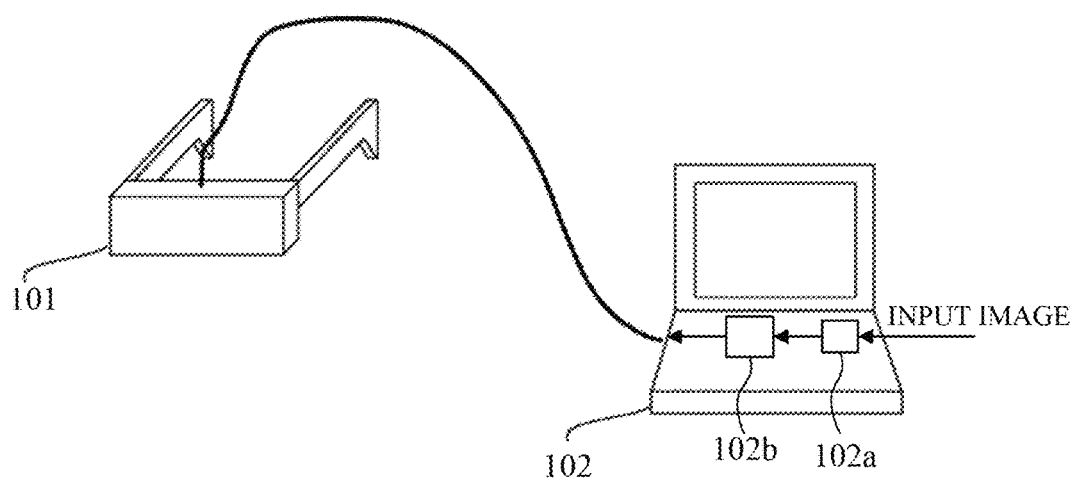
FIG. 1 illustrates an image display apparatus according to a first embodiment of the present invention.

FIG. 1 illustrates a structure of an image display system that includes an HMD 101 as an image display apparatus according to a first embodiment of the present invention and an image processing apparatus 102. The HMD 101 is connected to the image processing apparatus 102 as a personal computer via a cable or wirelessly so that they communicate with each other. The image processing apparatus 102 includes an image acquirer (image processor) 102a that acquires an input image input from an external apparatus or previously stored in the image processing apparatus 102. In addition, the image processing apparatus 102 further includes a processor 102b that provides image processing that generates an original image by performing for the input image correction processing using an aberration correction value (correction data) according to an optical aberration in an observation optical system in the HMD 101. The processor 102b outputs the original image data generated by the image processing to the HMD 101.

Figure 2:
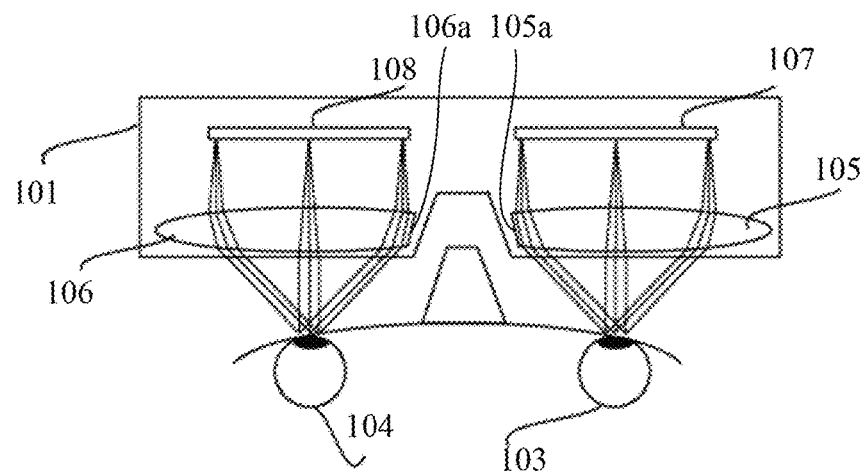
FIG. 2 is a top view of an observation optical system in the image display apparatus according to the first embodiment.

FIG. 2 illustrates the structure of the HMD 101. Reference numerals 103 and 104 denote right and left eyes of an observer. Reference numeral 105 denotes a right-eye observation optical system, and reference numeral 106 denotes a left-eye observation optical system. Reference numeral 107 denotes a right-eye display device (or element), and reference numeral 108 denotes a left-eye display device. The right-eye and left-eye display devices 107 and 108 display the original image input from the image processing apparatus 102. This embodiment uses an organic EL element as a self-luminous element for each of the right-eye and left-eye display devices 107 and 108.

The right-eye observation optical system 105 leads light (referred to as a "light flux" hereinafter) from the original image displayed on the right-eye display device 107 to the right eye 103 of the observer, and the left-eye observation optical system 106 leads a light flux from the original image displayed on the left-eye display device 108 to the left eye 104 of the observer. The right-eye and left-eye observation optical systems 105 and 106 enable an enlarged image of the original image to be observed by the right eye 103 and the left eye 104. Each of the right-eye and left-eye observation optical systems 105 and 106 has a horizontal display field angle of 80°, a vertical display field angle of 60°, and a diagonal display field angle of 91°.

Figure 6:
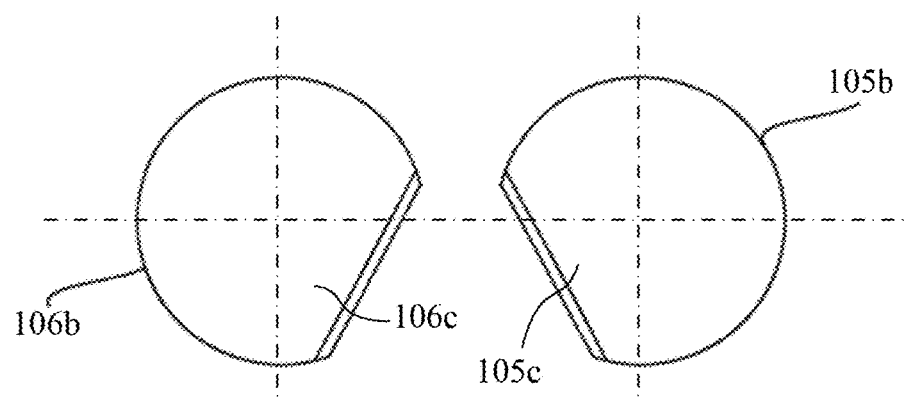
FIG. 6 is a front view of the observation optical system according to the first embodiment.

The right-eye and left-eye observation optical systems 105 and 106 have nose escape shapes 105a and 106a shaped by cutting parts on the nose side so that the HMD 101 does not interfere with the nose of the observer when the observer wears the HMD 101 on his head. Hence, as illustrated in FIG. 6, an effective area 105c of the right-eye observation optical system 105 on the nose side (area which the light flux used for the image observation passes) is narrower than an effective area 105b on a right ear side. An effective area 106c of the left-eye observation optical system 106 on the nose side is narrower than an effective area 106b on a left ear side.

In FIG. 2, the right eye 103 and the left eye 104 of the observer are located at positions corresponding to the designed eye relief (first distance referred to as a "normal eye relief" hereinafter) for the right-eye and left-eye observation optical systems 105 and 106, and the right eye 103 and the left eye 104 are located at the front view positions facing the front. In the following description, the state in which the right eye 103 and the left eye 104 are located at the positions corresponding to the normal eye relief will be referred to as a normal eye relief state, and the state in which the right eye 103 and the left eye 104 are located at the front view positions will be referred to as a front view state.

In the front view state, the right-eye observation optical system 105 leads the light flux from the entire original image on the right-eye display device 107 to the right eye 103 even with the nose escape shape 105a. The left-eye observation optical system 106 leads the light flux from the entire original image on the left-eye display device 108 to the left eye 104 even with the nose escape shape 106a. Thus, in the front view state, the nose escape shapes 105a and 106b do not shield the light fluxes from the original image, and the observer can observe the entire enlarged image of the original image.

On the other hand, in the normal eye relief state, when the observer rotates the right eye 103 and the left eye 104 from the front view position to the right as illustrated in FIG. 3, the right-eye observation optical system 105 leads the light flux from a right area in the original image on the right-eye display device 107 to the right eye 103. However, the left-eye observation optical system 106 cannot lead or take the light flux from a right area in the original image on the left-eye display device 108 to the left eye 104 due to the nose escape shape 106a.

Similarly, in the normal eye relief state, when the observer rotates the right eye 103 and the left eye 104 from the front view position to the left, the left-eye observation optical system 106 leads the light flux from a left area in the original image on the left-eye display device 108 to the left eye 104. However, the right-eye observation optical system 105 cannot lead the light flux from a left area in the original image on the right-eye display device 107 to the right eye 103 due to the nose escape shape 105a.

For example, when a distortion-free original image is displayed on the right-eye display device 107 as illustrated in FIG. 4A, the image viewed by the observer through the right-eye observation optical system 105 is a distorted image as illustrated in FIG. 4B due to the distortion in the right-eye observation optical system 105. The lower left part is missing in the image illustrated in FIG. 4B because the nose escape shape 105a shields the light flux from the original image. When the right-eye display device 107 displays a white line, the image viewed by the observer through the right-eye observation optical system 105 forms lines separated into red, green, and blue derived from the white line due to the lateral chromatic aberration in the right-eye observation optical system 105. This is similarly applied to the left-eye observation optical system 106.

Hence, the processor 102b in the image processing apparatus 102 corrects the input image illustrated in FIG. 4A (uncorrected original image) to an original image having a distortion reverse to that generated in each observation optical system as illustrated in FIG. 4C, or provides image processing (correction processing) for generating the corrected original image. This configuration reduces the distortion of the image viewed by the observer through each observation optical system. Moreover, the correction processing provided by the image processing apparatus 102 for generating the original images having different shapes for each color of red, green, and blue can reduce the lateral chromatic aberration. When each observation optical system has few distortions, the correction processing for reducing only the lateral chromatic aberration may be made. When each observation optical system has few lateral chromatic aberrations, the correction processing for reducing only the distortion may be performed.

Next follows a description of the correction processing performed by the processor 102b in the image processing apparatus 102. The processor 102b executes the image processing that includes correction processing in accordance with an image processing program as a computer program.

As understood from FIGS. 2 and 3, the light fluxes on the right side pass different positions in the observation optical systems between when the eyes (eyeballs) of the observer are located at the front view positions and when the eyes rotate to the right, and the optical aberrations of the observation optical systems are consequently different. When the observer observes the image through the observation optical systems and the eyeballs rotate and observe the desired directions, the optical aberrations in the observation optical systems need to be reduced in the image. Hence, in the oblique view state in which the eyeballs rotate from the front view positions, the aberration correction values as the correction data used for the optical aberration correction to the original image in the correction processing may be calculated based on the optical aberrations when the exit pupil is distant from the eye relief by the rotating radius of each eyeball.

More specifically, the HMD 101 according to this embodiment has a normal eye relief of 20 mm and the adult has an eyeball rotating radius of about 10 mm. Thus, the aberration correction value may be calculated based on the optical aberration in the observation optical system in the oblique view state when the exit pupil is distant from the observation optical system by 30 mm. However, since the observation optical system according to this embodiment has the nose escape shape, in the oblique view state in which the exit pupil is distant by 30 mm, the image formed by the light flux that passes the nose escape shape cannot be observed as illustrated in FIG. 4B. Hence, the optical aberration at this field angle on the nose escape shape side cannot be actually measured in the oblique view state.

According to this embodiment, the nose escape shape 105a in the right-eye observation optical system 105 shields the light flux in the field angle range from 40° to 30° on the left side of the field angle center in the horizontal display field angle and the vertical display field angle of 0° in the oblique view state to the left in which the exit pupil is distant by 30 mm. In addition, the nose escape shape 105a shields the light flux in the field angle range from 45.5° to 32° at the lower left of the field angle center in the diagonal display field angle. On the other hand, the nose escape shape 106a in the left-eye observation optical system 106 shields the light flux in the field angle range from 40° to 30° on the right side of the field angle center in the horizontal display field angle and the vertical display field angle of 0° in the oblique view state to the right in which the exit pupil is distant by 30 mm. In addition, the nose escape shape 106a shields the light flux in the field angle range from 45.5° to 32° at the lower right of the field angle center in the diagonal display field angle.

Thus, in each observation optical system, the diagonal display field angle that enables the image to be observed while the nose escape shape on the nose escape shape side of the field angle center does not shield the light flux is 70% of the diagonal display field angle (diagonal semi-field angle) on the side opposite to the nose escape shape side of the field angle center. The following description referrers to as a specific area the area that emits a light flux shielded by the nose escape shape in each observation optical system in the oblique view state in the original image displayed on each display device.

In order to prevent the interference with the nose when the observer wears the HMD 101 on the head, the nose escape shapes 105a and 105b may be made larger. However, the excessively large nose escape shapes 105a and 105b cause the display image to get chipped. Thus, the following condition (1) may be satisfied, $$0.65 \leq \theta 1/\theta 2 \leq 0.85 \quad (1)$$

where θ1 is a field angle on a nose escape shape side (specific area side) of the field angle center, and θ2 is a field angle on a side opposite to the nose escape shape side of the field angle center, in a diagonal display field angle formed by each observation optical system.

Figure 5:
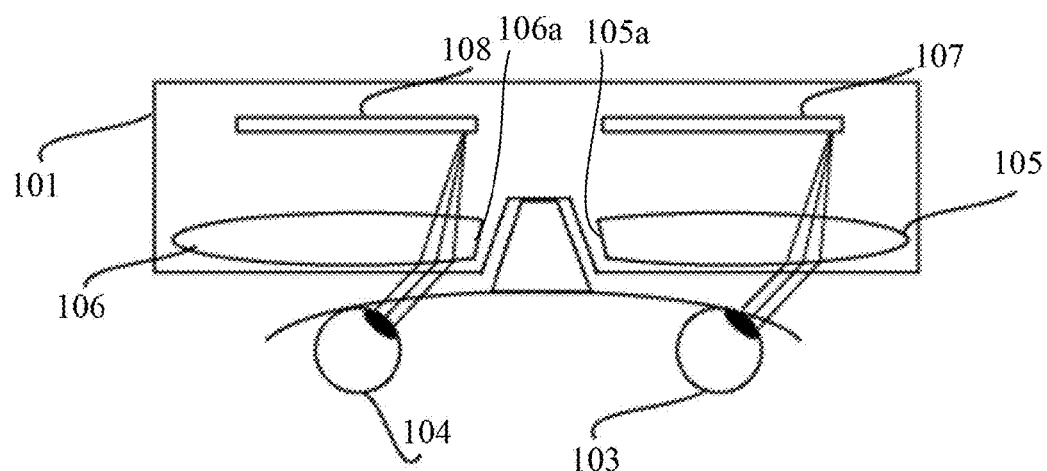
FIG. 5 is a top view of the observation optical system to which each eye of the observer is closer than the normal position according to the first embodiment.

The aberration correction value can be calculated based on the optical aberration at the position with the exit pupil distant by 30 mm and the designed value or the surface shape error simulation value of each observation optical system. However, as illustrated in FIG. 5, when the observer brings the right eye 103 and the left eye 104 closer to the right-eye and left-eye observation optical systems 105 and 106, the eye relief can be a short eye relief (second distance, such as 8 mm) shorter than the normal eye relief. In this state, which will be referred to as a "short eye relief state" hereinafter, and in the oblique view state to the right, the image can be observed at a field angle on the nose escape shape side although the image cannot be observed in the oblique view state and the normal eye relief state. When the optical aberration at the field angle on the nose escape shape side in this short eye relief state is calculated on the assumption that the exit pupil is distant by 30 mm, the optical aberration cannot be well corrected or the good (natural) image cannot be observed since the optical aberration is different from that in the short eye relief state.

Accordingly, this embodiment calculates the aberration correction value (first correction data) in the area other than the specific area in the original image by using the optical aberration when the exit pupil is located at the first position that is distant from the observation optical system by 30 mm made by adding the rotating radius of the eyeball to the normal eye relief. On the other hand, this embodiment calculates the aberration correction value (second correction data) in the specific area by using the optical aberration when the exit pupil is located at the second position that is distant from the observation optical system by a distance shorter than 30 mm. This embodiment sets the second position of 18 mm by adding the rotating radius of the eyeball to the short eye relief of 8 mm.

Figure 11:
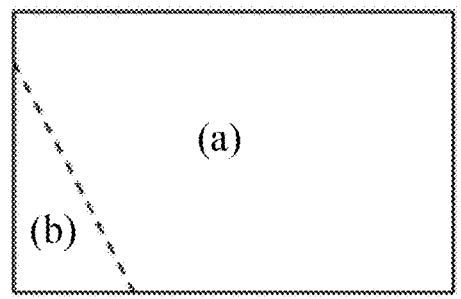
FIG. 11 illustrates distortion correction processing according to the second embodiment.

As illustrated in FIG. 11, the right-eye aberration correction value in the area (a) other than the specific area is calculated based on the optical aberration when the exit pupil is distant from the right-eye observation optical system 105 by 30 mm. The right-eye aberration correction value in the specific area (b) is calculated based on the optical aberration when the exit pupil is distant from the right-eye observation optical system 105 by 18 mm. This embodiment then prepares an aberration correction value table used for the correction processing for the entire original image by combining these two aberration correction values with each other. This is similarly applied to the left-eye aberration correction value.

By calculating the aberration correction value in such a way, the aberration correction value for the area other than the specific area can be calculated by using the actually measured optical aberration with the exit pupil distant from the observation optical system by 30 mm (or the optical aberration corresponding to the position of 30 mm). Moreover, the aberration correction value for the specific area can be calculated by using the actually measured optical aberration with the exit pupil distant from the observation optical system by 18 mm (or the optical aberration corresponding to the position of 18 mm). Hence, the aberration correction value can be calculated by using the actually measured optical aberration for the entire original image. When the aberration correction value is calculated based on the optical aberration with the designed value or the surface shape error simulation value, the optical aberration is calculated with the exit pupil distant by each of 30 mm and 18 mm. Then, the aberration correction value for the area other than the specific area may be calculated based on the optical aberration corresponding to the position of 30 mm and the aberration correction value for the specific area may be calculated by using the optical aberration corresponding to the position of 18 mm.

In either case, in the short eye relief state and oblique view state, the natural image can be observed in which the optical aberration is well corrected for an image in the specific area.

In combining the two aberration correction values for the specific area and the other area, the aberration correction value in the boundary area between them may smoothly change so that the image corresponding to the boundary area does not change unnaturally. It is thus desirable to calculate the aberration correction value of the boundary area so that it smoothly changes through interpolation processing such as a linear interpolation and a bicubic method using two aberration correction values for the specific area and other area.

Each of the right-eye and left-eye observation optical systems 105 and 106 in this embodiment includes a single lens having a rotationally symmetrical and spherical shape. Use of a rotationally symmetrical lens for the observation optical system can provide the distortion and lateral chromatic aberration with a rotationally symmetrical shape and thus the aberration correction value used for the correction processing in the image processing apparatus 102 may be set to a function that uses as a parameter a distance from the center of the display device. Where the distortion or the lateral chromatic aberration is not rotationally symmetrical due to the manufacturing errors or the like, an aberration correction value table may be prepared which has an aberration correction value for each pixel of the display device.

Each of the right-eye and left-eye observation optical systems 105 and 106 may have an aspheric shape or a plurality of lenses. The right-eye and left-eye display devices 107 and 108 in this embodiment include the organic EL elements, but may use other display devices, such as a transmission type liquid crystal element, a reflection type liquid crystal element, and a digital micromirror device. In this case, a light source and an illumination optical system for guiding light from the light source to the display device are required.

Second Embodiment

Figure 7:
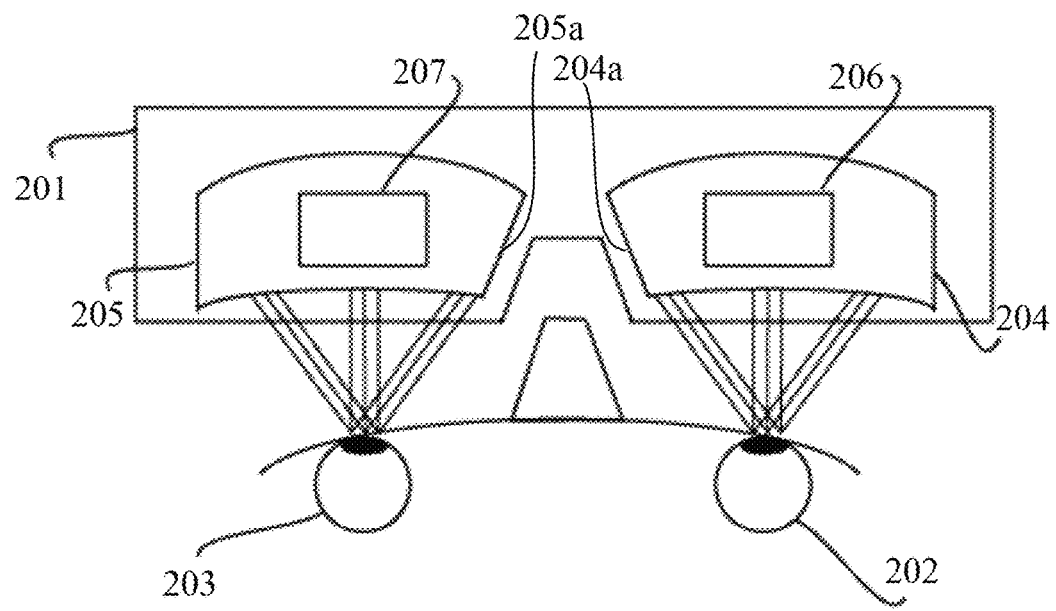
FIG. 7 is a top view of an observation optical system in an image display apparatus according to a second embodiment.

FIG. 7 illustrates a structure of an HMD 201 according to a second embodiment the present invention. Reference numerals 202 and 203 denote right and left eyes of an observer, respectively. Reference numeral 204 denotes a right-eye observation optical system, and reference numeral 205 denotes a left-eye observation optical system. Reference numeral 206 denotes a right-eye display device, and reference numeral 207 denotes a left-eye display device. The right-eye and left-eye display devices 206 and 207 display an original image input from the image processing apparatus 102 described in the first embodiment. Even this embodiment uses an organic EL element as a self-luminous element for the right-eye and left-eye display devices 206 and 207.

The right-eye observation optical system 204 guides the light flux from the original image displayed on the right-eye display device 206 to the right eye 202 of the observer, and the left-eye observation optical system 205 guides the light flux from the original image displayed on the left-eye display device 207 to the left eye 203 of the observer. The right-eye and left-eye observation optical systems 204 and 205 enable the right eye 202 and the left eye 203 to observe enlarged images of the original image. The right-eye and left-eye observation optical systems 204 and 205 has a horizontal display field angle of 70°, a vertical display field angle of 40°, and a diagonal display field angle of 76°.

Figure 8:
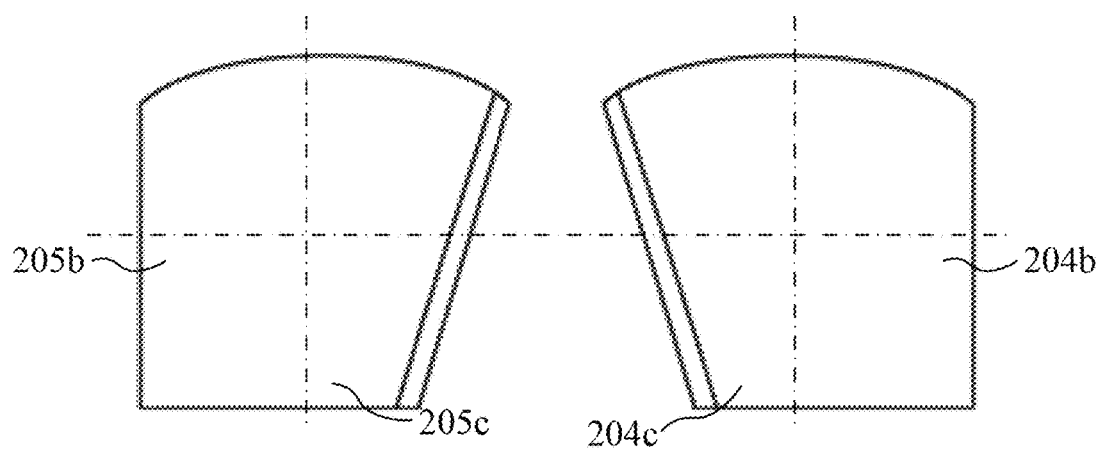
FIG. 8 is a front view of the observation optical system according to the second embodiment.

The right-eye and left-eye observation optical systems 204 and 205 have nose escape shapes 204a and 205a shaped by cutting part of the nose side so that the HMD 201 does not interfere with the nose of the observer when the observer wears the HMD 201 on the head. Therefore, as illustrated in FIG. 8, an effective area 204c of the right-eye observation optical system 204 on the nose side is narrower than an effective area 204b on a right ear side. An effective area 205c of the left-eye observation optical system 205 on the nose side is narrower than an effective area 205b on a left ear side.

Even in this embodiment, similar to the first embodiment, the processor 102b in the image processing apparatus 102 corrects the original image so that it has a distortion reverse to the distortion generated in each observation optical system for the input image. That is, the processor 102b performs image processing (correction processing) for generating a corrected original image.

Figure 9:
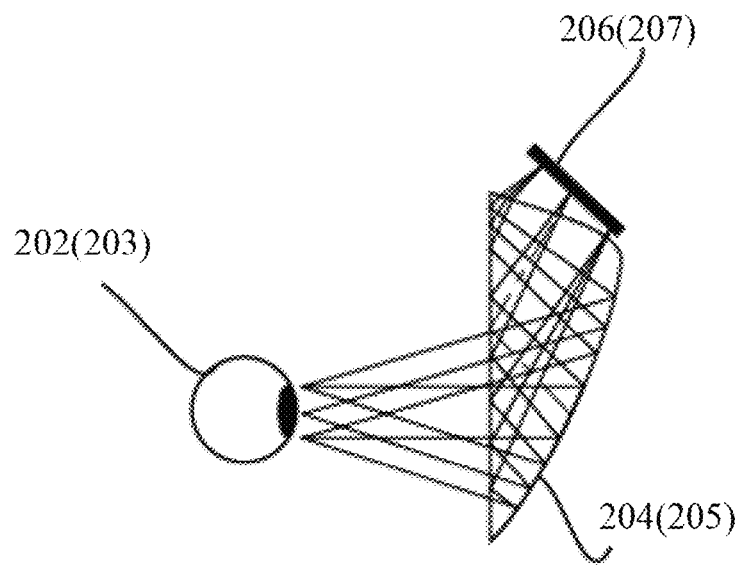
FIG. 9 is a side view of the observation optical system according to the second embodiment.

The right-eye and left-eye observation optical systems 204 and 205 according to this embodiment thins the optical system by folding the optical path by using a decentering reflection surface as illustrated in FIG. 9. The right-eye and left-eye observation optical systems 204 and 205 include a prism (optical element) filled with an optical medium, such as glass or plastic having a refractive index larger than 1.

The light flux from the right-eye display device 206 is reflected twice in the right-eye observation optical system 204 and guided to the right eye 202. Since the exit surface to the right eye 202 in the right-eye observation optical system 204 is an optical surface having a reflection action and a transmission action, the reflection may be an internal total reflection in order to eliminate the loss of the light amount. By setting a free-form surface shape to the surface constituting the right-eye observation optical system 204, the degree of freedom of decentering aberration correction increases and a good quality image can be displayed. This is similarly applied to the left-eye observation optical system 205.

7 illustrates that a normal relief state in which the right eye 202 and the left eye 203 of the observer are disposed at positions corresponding to the normal eye reliefs of the right-eye and left-eye observation optical systems 204 and 205, and a front view state in which the right eye 202 and the left eye 203 are located at the front view positions. In this state, the right-eye observation optical system 204 guides the light flux from the entire original image on the right-eye display device 206 to the right eye 202 even with the nose escape shape 204a. The left-eye observation optical system 205 guides the light flux from the entire original image on the left-eye display device 207 to the left eye 203 even with the nose escape shape 205a. That is, in the front view state, the nose escape shapes 204a and 205a do not shield the light flux from each original image, and the observer can observe the entire enlarged image of the original image.

Figure 10:
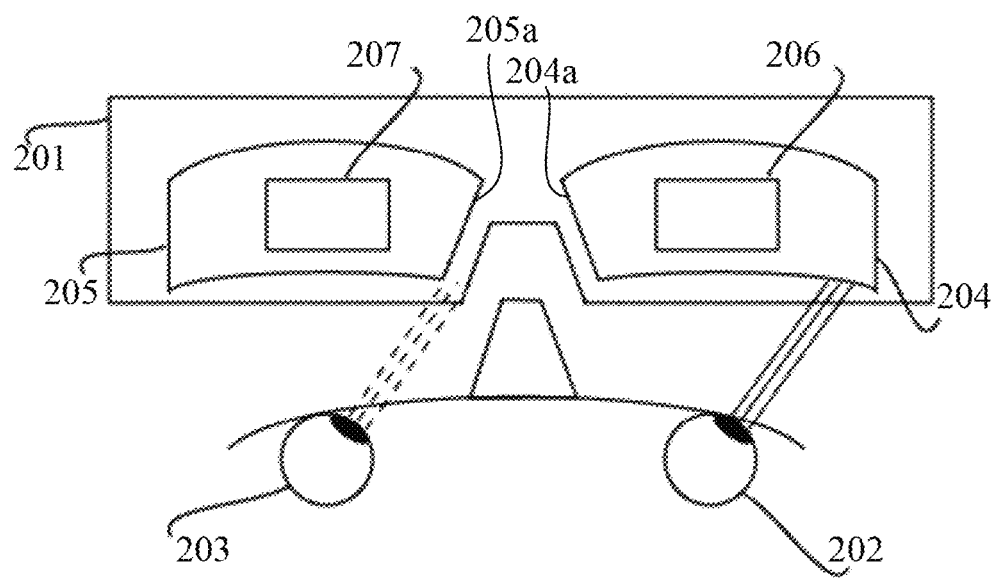
FIG. 10 is a top view of the observation optical system when each eye of the observer in the second embodiment at a normal position rotates to the right.

On the other hand, in the normal eye relief state, as illustrated in FIG. 10, when the observer rotates the right eye 202 and the left eye 203 from the front view position to the right, the right-eye observation optical system 204 leads the light flux from the right area in the original image on the right-eye display device 207 to the right eye 202. However, due to the left-eye nose escape shape 205a, the left-eye observation optical system 205 cannot guide or take the light flux from the right area in the original image on the left-eye display device 207 to the left eye 203.

Similarly, in the normal eye relief state, when the observer rotates the right eye 202 and the left eye 203 from the front view position to the left, the left-eye observation optical system 205 guides the light from the left area in the original image on the left eye display device 207 to the left eye 203. However, due to the nose escape shape 204a, the right-eye observation optical system 204 cannot guide the light flux from the left side area of the original image on the right-eye display device 206 to the right eye 202.

As described in the first embodiment, in displaying the distortion-free original image on the right-eye display device 206 as illustrated in FIG. 4A, the image viewed by the observer through the right-eye observation optical system 204 is a distorted image as illustrated in FIG. 4B due to the distortion in the right-eye observation optical system 204. The lower left part of the image illustrated in FIG. 4B gets chipped because the nose relief portion 204a shields a light flux from the original image. When the right-eye display device 206 displays a white line, the image viewed by the observer through the right-eye observation optical system 204 forms lines separated into red, green, and blue derived from the white line due to the lateral chromatic aberration in the right-eye observation optical system 204. This is similarly applied to the left-eye observation optical system 205.

Thus, even this embodiment, similar to the first embodiment, the image processing apparatus 102 performs the correction processing for correcting the original image (input image) shown in FIG. 4A to the original image having the distortion reverse to that generated in each observation optical system as illustrated in FIG. 4C. This configuration can reduce the distortion of the image viewed by the observer through each observation optical system. Further, the correction processing performed by the image processing apparatus 102 can reduce the lateral chromatic aberration by generating the original images having different shapes for respective colors of red, green, and blue. When each observation optical system has few distortions, the correction processing may be performed for reducing only the lateral chromatic aberration. When each observation optical system has few lateral chromatic aberrations, the correction processing is performed for reducing only the distortion.

Next follows a description of the correction processing performed by the processing unit 102b in the image processing apparatus 102 according to this embodiment. As understood from FIGS. 7 and 10, the light fluxes on the right side pass different positions in the observation optical systems between when the eyes (eyeballs) of the observer are located at the front view positions and when the eyes rotate to the right, and the optical aberrations of the observation optical systems are consequently different. As described in the first embodiment, when the observer observes the image through the observation optical systems and the eyeballs rotate and observe the desired directions, the optical aberrations in the observation optical systems need to be reduced in the image. Hence, in the oblique view state in which the eyeballs rotate from the front view position, the aberration correction values as the correction data used for the optical aberration correction to the original image in the correction processing may be calculated based on the optical aberrations when the exit pupil is distant from the eye relief by the rotating radius of each eyeball.

More specifically, the HMD 201 according to this embodiment has a normal eye relief of 18 mm and the adult has an eyeball rotating radius of about 10 mm. Thus, the aberration correction value may be calculated based on the optical aberration in the observation optical system when the exit pupil is distant by 28 mm. However, since the observation optical system according to this embodiment has the nose escape shape, in the oblique view state in which the exit pupil is distant by 28 mm, the image formed by the light flux that passes the nose escape shape cannot be observed as illustrated in FIG. 4B. Hence, the optical aberration at this field angle on the nose escape shape side cannot be actually measured in the oblique view state.

According to this embodiment, the nose escape shape 204a in the right-eye observation optical system 204 shields the light flux in the field angle range from 35° to 30° on the left side of the field angle center in the horizontal display field angle and the vertical display field angle of 0° in the oblique view state to the left in which the exit pupil is distant by 28 mm. In addition, the nose escape shape 204a shields the light flux in the field angle range from 38° to 29° at the lower left of the field angle center in the diagonal display field angle. On the other hand, the nose escape shape 205a in the left-eye observation optical system 205 shields the light flux in the field angle range from 35° to 30° on the right side of the field angle center in the horizontal display field angle and the vertical display field angle of 0° in the oblique view state to the right in which the exit pupil is distant by 28 mm. In addition, the nose escape shape 205a shields the light flux in the field angle range from 38° to 29° at the lower right of the field angle center in the diagonal display field angle.

Thus, in each observation optical system, the diagonal display field angle that enables the image to be observed while the nose escape shape on the nose escape shape side of the of the field angle center does not interfere with the light flux is 76% of the diagonal display field angle (diagonal semi-field angle) on the side opposite to the nose escape shape side of the field angle center. The following description also referrers to as the specific area the area that emits a light flux shielded by the nose escape shape in each observation optical system in the oblique view state in the original image displayed on each display device.

In order to prevent the interference with the nose when the observer wears the HMD 201 on the head, the nose escape shapes 204a and 205b may be made lamer. However, the excessively large nose escape shapes 204a and 205b cause the display image to get chipped. Thus, this embodiment may satisfy the condition (1) described in the first embodiment, where θ1 is the field angle on the nose escape shape side (specific area side) of the field angle center, and θ2 is the field angle on the side opposite to the nose escape shape side of the field angle center, in the diagonal display field angle formed by each observation optical system. Moreover, this embodiment may satisfy the following condition (2):

$$0.70 \leq \theta 1/\theta 2 \leq 0.80 \tag{2}$$

Figure 12:
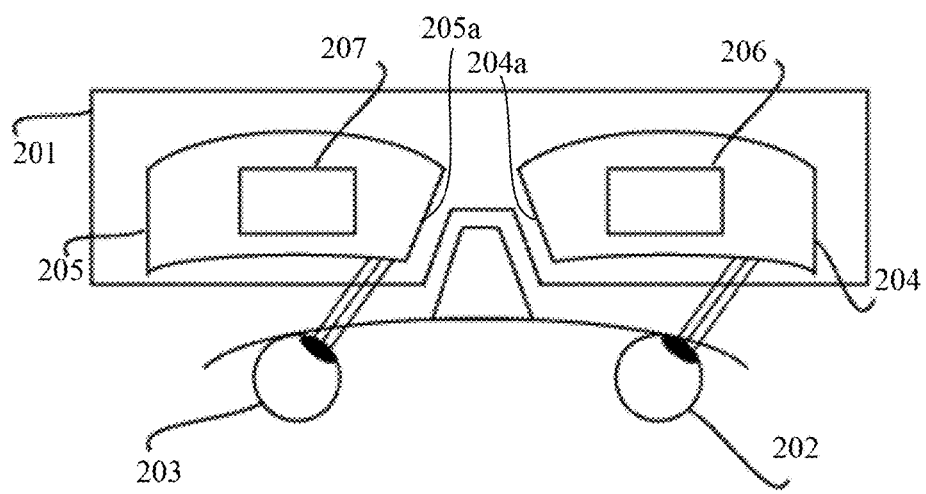
FIG. 12 is a top view of the observation optical system to which each eye of the observer is closer than the normal position according to the second embodiment.

The aberration correction value can be calculated based on the optical aberration at the position with the exit pupil distant by 28 mm and the designed value or the surface shape error simulation value of each observation optical system. However, as illustrated in FIG. 12, when the observer brings the right eye 203 and the left eye 204 closer to the right-eye and left-eye observation optical systems 204 and 205, the eye relief can be a short eye relief (second distance, such as 8 mm) shorter than the normal eye relief. In this state, which will be referred to as a "short eye relief state" hereinafter, and in the oblique view state to the right, the image can be observed at a field angle on the nose escape shape side although the image cannot be observed in the oblique view state and the normal eye relief state. When the optical aberration at the field angle on the nose escape shape side in this short eye relief state is calculated on the assumption that the exit pupil is distant by 28 mm, the optical aberration cannot be well corrected or the good (natural) image cannot be observed since the optical aberration is different from that in the short eye relief state.

Accordingly, this embodiment calculates the aberration correction value (first correction data) in the area other than the specific area in the original image by using the optical aberration when the exit pupil is located at the first position that is distant from the observation optical system by 28 mm made by adding the rotating radius of the eyeball to the normal eye relief. On the other hand, this embodiment calculates the aberration correction value (second correction data) in the specific area by using the optical aberration when the exit pupil is located at the second position that is distant from the observation optical system by a distance shorter than 28 mm.

In this case, this embodiment calculates an aberration correction value for the specific area so that the aberration correction value in the specific area smoothly changes from the nose side and is connected to the aberration correction value for the area adjacent to the specific area, or so that the image does not unnaturally change in a direction from the specific area to the adjacent area. More specifically, a plurality of second positions are set so that the exit pupil approaches to the observation optical system as a position approaches to the nose side. For example, as illustrated in FIG. 13, the second position on the right eye side is changed in order of 26 mm, 24 mm, 22 mm, 20 mm, and 18 mm to the nose side. In other words, this embodiment uses the aberration correction value according to the optical aberration corresponding to each of the plurality of second positions that are different from each other for a plurality of areas in the specific area.

In other words, this embodiment generates the original images for the first area and the second area by performing different correction processing for the first area and the second area more distant from the area other than the specific area than the first area. This is similarly applied to the second position on the left eye side.

By calculating the aberration correction value in such a way, this embodiment can calculate the aberration correction value for the area other than the specific area by using the actually measured optical aberration with the exit pupil distant from the observation optical system by 28 mm (or the optical aberration corresponding to the position of 28 mm). This embodiment further calculates the aberration correction value for the specific area by using the actually measured optical aberration with the exit pupil distant from the observation optical system by 26 mm, 24 mm, 22 mm, 20 mm, and 18 mm (or the optical aberration corresponding to each position). Therefore, this embodiment can calculate the aberration correction value by using the optical aberration actually measured for the entire original image. In calculating the aberration correction value based on the optical aberration with the designed value or the surface shape error simulation value, the optical aberration is calculated with the exit pupil distant by 28 mm and the optical aberration with the exit pupil distant by 26 mm, 24 mm, 22 mm, 20 mm, and 18 mm. Then, the aberration correction value for the area other than the specific area may be calculated based on the optical aberration corresponding to the position of 28 mm, and the aberration correction value for a specific area may be calculated based on the optical aberrations corresponding to the positions of 26 mm, 24 mm, 22 mm, 20 mm and 18 mm.

Figure 14G:
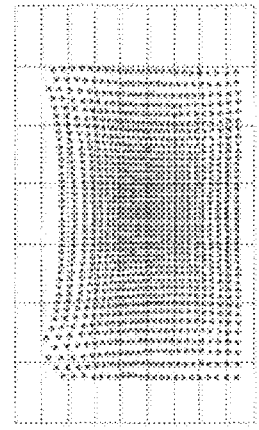
FIGS. 14A to 14G illustrate a distortion for each exit pupil position in the observation optical system according to the second embodiment.
Figure 14D:
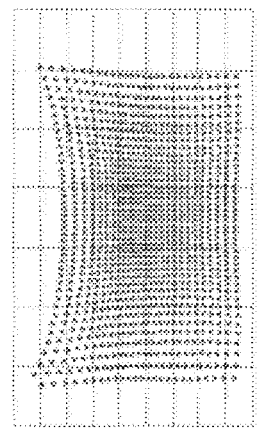
Figure 14E:
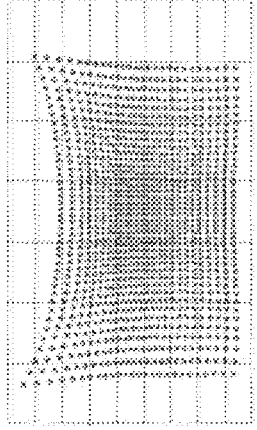
Figure 14F:
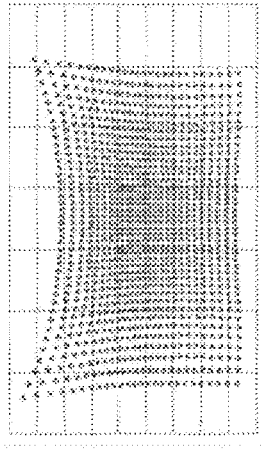
Figure 14A:
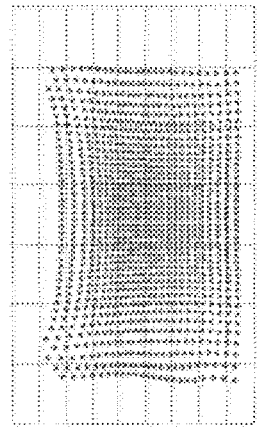
Figure 14B:
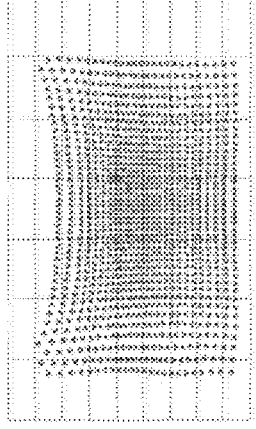
Figure 14C:
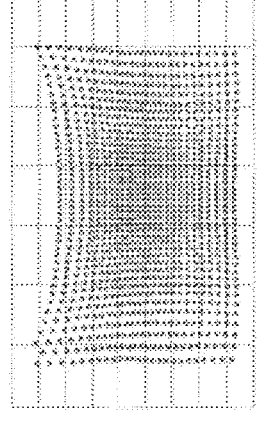

FIGS. 14A to 14G illustrate simulation results of the optical aberration (distortion) in the right-eye observation optical system 204 in the HMD 201 according to this embodiment. Since it is calculated by simulation, the distortion at field angle on the lower left nose escape shape side can also be calculated. FIG. 14A illustrates a distortion with the exit pupil distant from the observation optical system by 28 mm. Similarly, FIGS. 14B to 14F illustrate distortions with the exit pupil located at positions of 26 mm, 24 mm, 22 mm, 20 mm, and 18 mm, respectively.

As understood from FIGS. 14A to 14G, the distortion shape changes with the position of the exit pupil. In particular, the distortion shape at the field angle on the lower left nose escape shape side significantly changes with the position of the exit pupil, and a shape difference is remarkable between FIG. 14A and FIG. 14F. FIG. 14G illustrates a combined distortion of the distortions with the exit pupil located at the positions of 28 mm, 26 mm, 24 mm, 22 mm, 20 mm and 18 mm.

Figure 15A:
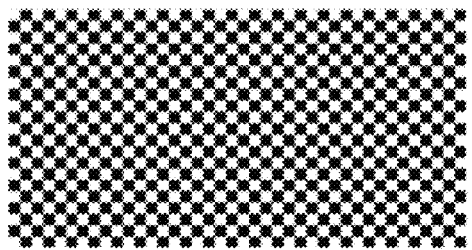
FIGS. 15A and 15B illustrate images before and after the aberration correction according to the second embodiment.
Figure 15B:
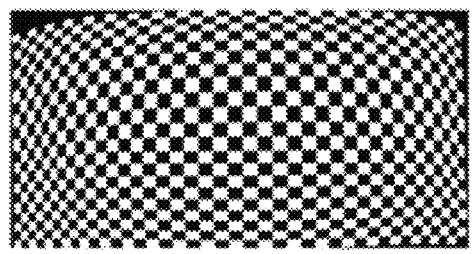

This embodiment performs correction processing so as to provide an input image with a distortion reverse to the combined distortion illustrated in FIG. 14G. As a result, as illustrated in FIG. 13, an original image is obtained to which the aberration correction values are given based on the optical aberrations corresponding to the exit pupil positions of 26 mm, 24 mm, 22 mm, 20 mm, and 18 mm toward the nose side for the specific area. FIG. 15A illustrates an original image before the aberration correction, and FIG. 15B illustrates an original image after the aberration correction, respectively. Thereby, in the short eye relief state and the oblique view state, the observer can observe a natural image in which optical aberration is well corrected to an image for the specific area.

This embodiment reduces a variation amount for each aberration correction value by calculating a plurality of aberration correction values based on the optical aberrations at a plurality of gradually different exit pupil positions, rather than calculating the aberration correction value for the specific area based on the optical aberration at one exit pupil position (second position) as in the first embodiment. This embodiment can change the aberration correction value or the image more smoothly than the first embodiment, and make less conspicuous the image view change from the front view state to the oblique view state in the short eye relief state.

In addition, even when the eye relief gradually reduces, the aberration correction value corresponding to the oblique view state in each eye relief can be used and the natural image can be observed in the oblique view state with each eye relief.

When a prism having an eccentric free-form surface is used for the observation optical system as in this embodiment, the distortion and the lateral chromatic aberration are not rotationally symmetrical. Hence, an aberration correction value table may be prepared which has aberration correction values for each pixel in the display device.

The observation optical system according to this embodiment has no intermediate imaging plane, but may have an intermediate imaging plane.

Each embodiments can generate an original image so that the image cannot be viewed with the eye relief of the first distance in the oblique view state and the image can be well viewed with the eye relief of the second distance.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-166287, filed on Aug. 31, 2017, which is hereby incorporated by reference herein in its entirety.

What is claimed is:

1. An image processing apparatus used with an image display apparatus and configured to generate an original image, the image display apparatus includes a display device configured to display the original image, and an observation optical system configured to lead light from the display device to an eye of an observer, the observation optical system, in an oblique view state for the eyes that are rotated from those facing a front in a front view state, not leading light from a specific area in the light from the display device to the eye when a distance between the observation optical system and the eye is a first distance, and leading the light from the specific area to the eye when the distance between the observation optical system and the eye is a second distance shorter than the first distance, the image processing apparatus comprising:

an image acquirer configured to acquire an input image; and a processor configured to generate the original image by performing for the input image correction processing using correction data according to an optical aberration of the observation optical system, wherein in the correction processing for the oblique view state, the processor uses first correction data according to the optical aberration corresponding to a first position distant from the observation optical system by a distance made by adding a rotating radius of the eye to the first distance, to generate an image corresponding to an area other than the specific area in the original image, and uses second correction data according to the optical aberration corresponding to a second position closer to the observation optical system than the first position to generate an image corresponding to the specific area wherein the following condition is satisfied, $$0.65 \leq \theta 1/\theta 2 \leq 0.85$$

where $\theta 1$ is a field angle on a specific area side of a field angle center and $\theta 2$ is a field angle on a side opposite to the specific area side with respect to the field angle center, in a diagonal display field angle formed by the observation optical system.

2. The image processing apparatus according to claim 1, wherein the observation optical system has a nose escape shape in the observation optical system on a nose side of the observer which is shaped to avoid interference with a nose of the observer, and wherein the nose escape shape prevents the light coming from the specific area from reaching the eye located at the first distance.

3. The image processing apparatus according to claim 1, wherein the observation optical system leads light from an entire display device to the eye when the eye at the front view position is located at each of the first distance and the second distance.

4. The image processing apparatus according to claim 1, wherein the processor uses for the specific area the second correction data according to the optical aberration corresponding to the second position distant from the observation optical system by a distance made by adding the rotating radius to the second distance, in the correction processing for the oblique view state.

5. The image processing apparatus according to claim 4, wherein the processor uses correction data obtained by interpolation processing to the first correction data and the second correction data, for a boundary area between the specific area and the area other than the specific area, in the correction processing for the oblique view state.

6. The image processing apparatus according to claim 1, wherein the processor uses the second correction data according to the optical aberration corresponding to each of the plurality of second positions that are different from one another for a plurality of areas in the specific area, in the correction processing for the oblique view state.

7. The image processing apparatus according to claim 1, wherein the optical aberration is a distortion.

8. The image processing apparatus according to claim 1, wherein the optical aberration is a lateral chromatic aberration.

9. An image processing apparatus used with an image display apparatus and configured to generate an original image, the image display apparatus includes a display device configured to display the original image, and an observation optical system configured to lead light from the display device to an eye of an observer, the observation optical system, in an oblique view state for the eyes that are rotated from those facing a front in a front view state, not leading light from a specific area in the light from the display device to the eye when a distance between the observation optical system and the eye is a first distance, and leading the light from the specific area to the eye when the distance between the observation optical system and the eye is a second distance shorter than the first distance, the image processing apparatus comprising:

an image acquirer configured to acquire an input image; and a processor configured to generate the original image by performing for the input image correction processing using correction data according to an optical aberration of the observation optical system, wherein in the correction processing for the oblique view state, the processor performs different correction processing for an image corresponding to a first area and an image corresponding to a second area more distant from an area other than the specific area than the from the first area when generating an image corresponding to the specific area in the original image, and wherein the following condition is satisfied, $$0.65 \leq \theta1/\theta2 \leq 0.85$$

where $\theta1$ is a field angle on a specific area side of a field angle center and $\theta2$ is a field angle on a side opposite to the specific area side with respect to the field angle center, in a diagonal display field angle formed by the observation optical system.

10. The image processing apparatus according to claim 1, wherein the observation optical system includes a right-eye observation optical system configured to lead the light from the display device to a right eye and a left-eye observation system configured to lead the light from the original image to a left eye, and wherein each of the right-eye and left-eye observation optical systems includes an optical element that has an optical surface that reflects and transmits the light and at least one reflection surface.

11. An image display system comprising:

an image display apparatus that includes a display device configured to display the original image, and an observation optical system configured to lead light from the display device to an eye of an observer, the observation optical system, in an oblique view state for the eyes that are rotated from those facing a front in a front view state, not leading light from a specific area in the light from the display device to the eye when a distance between the observation optical system and the eye is a first distance, and leading the light from the specific area to the eye when the distance between the observation optical system and the eye is a second distance shorter than the first distance; and an image processing apparatus used with the image display apparatus and configured to generate an original image, wherein the image processing apparatus includes:

an image acquirer configured to acquire an input image; and a processor configured to generate the original image by performing correction processing using correction data according to an optical aberration of the observation optical system, for the input image, wherein in the correction processing for the oblique view state, the processor uses first correction data according to the optical aberration corresponding to a first position distant from the observation optical system by a distance made by adding a rotating radius of the eye to the first distance, to generate an image corresponding to an area other than the specific area in the original image, and uses second correction data according to the optical aberration corresponding to a second position closer to the observation optical system than the first position to generate an image corresponding to the specific area, and wherein the following condition is satisfied, $$0.65 \leq \theta1/\theta2 \leq 0.85$$

where $\theta1$ is a field angle on a specific area side of a field angle center and $\theta2$ is a field angle on a side opposite to the specific area side with respect to the field angle center, in a diagonal display field angle formed by the observation optical system.

12. A non-transitory computer-readable storage medium storing a computer program that enables a computer to execute image processing configured to generate an original image, the computer being used with an image display apparatus that includes a display device configured to display the original image, and an observation optical system configured to lead light from the display device to an eye of an observer, the observation optical system, in an oblique view state for the eyes that are rotated from those facing a front in a front view state, not leading light from a specific area in the light from the display device to the eye when a distance between the observation optical system and the eye is a first distance, and leading the light from the specific area to the eye when the distance between the observation optical system and the eye is a second distance shorter than the first distance, the image processing includes:

processing configured to acquire an input image; and processing configured to generate the original image by performing correction processing using correction data according to an optical aberration of the observation optical system, for the input image, wherein the correction processing for the oblique view state uses first correction data according to the optical aberration corresponding to a first position distant from the observation optical system by a distance made by adding a rotating radius of the eye to the first distance, to generate an image corresponding to an area other than the specific area in the original image, and uses second correction data according to the optical aberration corresponding to a second position closer to the observation optical system than the first position to generate an image corresponding to the specific area, and wherein the following condition is satisfied, $$0.65 \leq \theta1/\theta2 \leq 0.85$$

where $\theta1$ is a field angle on a specific area side of a field angle center and $\theta2$ is a field angle on a side opposite to the specific area side with respect to the field angle center, in a diagonal display field angle formed by the observation optical system.

\* \* \* \* \*